Dec. 23, 1930.  E. G. LANZI  1,785,835
COATING APPARATUS
Filed Sept. 28, 1925    12 Sheets-Sheet 1

Witnesses:
William P. Kilroy
Harry R. White

Inventor.
Elmo G. Lanzi
By Hill & Hill
Attys

Dec. 23, 1930.   E. G. LANZI   1,785,835
COATING APPARATUS
Filed Sept. 28, 1925   12 Sheets-Sheet 6

Witnesses:
William P. Kilroy
Harry R. L. White

Inventor:
Elmo G. Lanzi
By Hill & Hill
Attys

Dec. 23, 1930.  E. G. LANZI  1,785,835
COATING APPARATUS
Filed Sept. 28, 1925   12 Sheets-Sheet 10

Witnesses:
William P. Kilroy
Harry L. White

Inventor
Elmo G. Lanzi
By Hill & Hill
Attys

Dec. 23, 1930. E. G. LANZI 1,785,835
COATING APPARATUS
Filed Sept. 28, 1925 12 Sheets-Sheet 12

Patented Dec. 23, 1930

1,785,835

UNITED STATES PATENT OFFICE

ELMO G. LANZI, OF CHICAGO, ILLINOIS, ASSIGNOR TO BONUS CANDY CORPORATION, OF CHICAGO, ILLINOIS, A CORPORATION OF ILLINOIS

COATING APPARATUS

Application filed September 28, 1925. Serial No. 59,102.

My invention relates to coating apparatus, and particularly to apparatus for subjecting nuts and candy centers to chocolate and other edible material.

My invention has among its other objects the provision of apparatus of the kind described which is convenient, durable, efficient and satisfactory for use wherever found applicable.

A particular object of the invention is to provide improved apparatus for producing chocolate-covered peanut clusters and bars and other confections of a like character.

Apparatus embodying one form of the invention comprises means for feeding predetermined quantities of nuts or the equivalent to a plurality of cages arranged around a shaft which is intermittently rotated in a single direction to dip the nuts or the equivalent into a vat containing chocolate or other coating material, each cage being advanced from a filling position through the vat to a discharging position and thence through the vat to the filling position. Each cage comprises means which is operable to eject the coated articles at the discharging position into one of a plurality of baskets which deposits the coated articles in single clusters or in bars upon sheets of paper carried by an endless belt. Excess coating material is preferably removed from the coated articles by an air blast. Cyclic timing means is provided for driving the improved apparatus.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 11 is an enlarged fragmentary section taken on the same line as Fig. 10;

Figure 4:
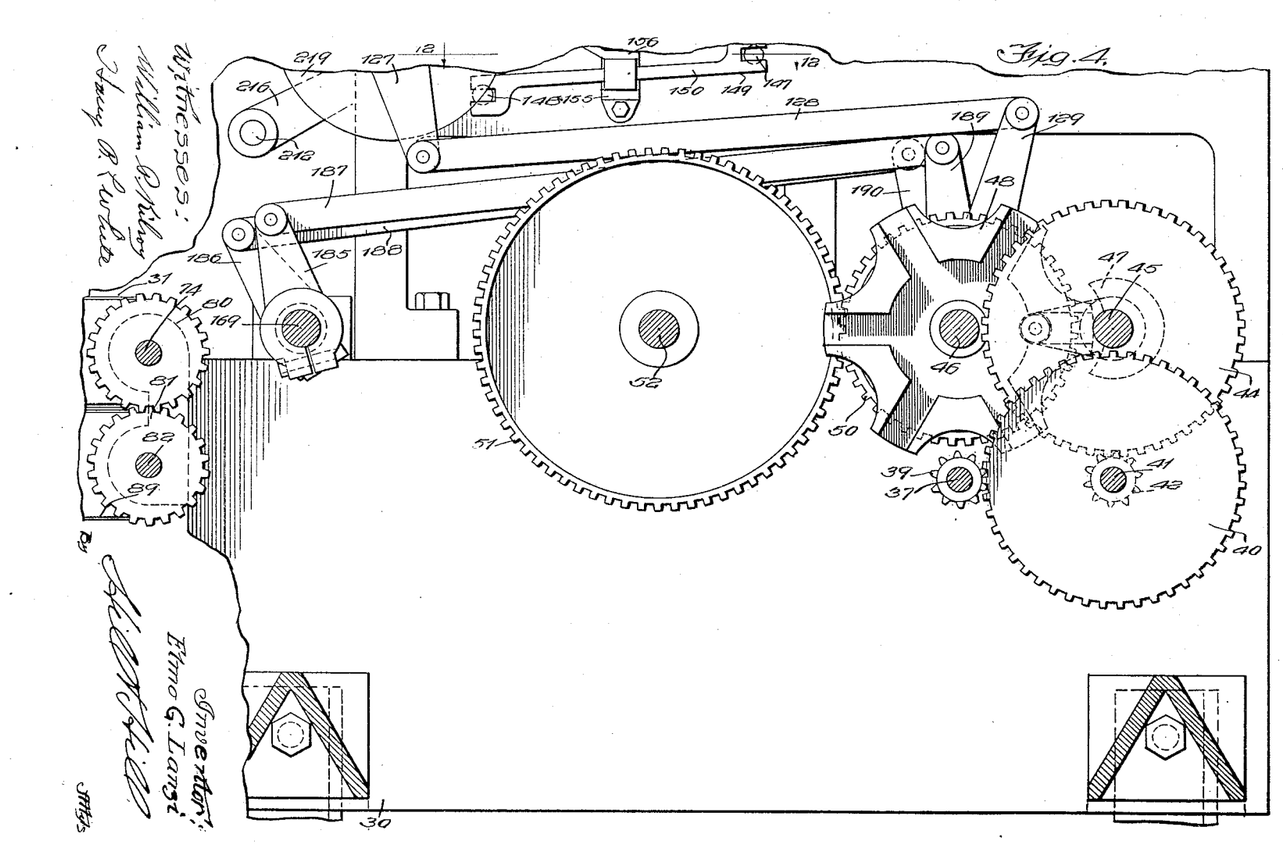
Fig. 4 is a section taken on line 4—4 of Fig. 2.

In the drawings I have shown the preferred form of the invention as it is embodied in a machine for coating nuts and the like with any suitable material, such as chocolate, the nuts being formed into clusters or into bars. The machine comprises a frame 30 which supports mechanism for dipping predetermined quantities of nuts and the like into a vat containing chocolate, the coated nuts being afterwards discharged upon a conveyor belt 31 mounted in an auxiliary frame 32. Any suitable means may be provided for driving the machine. In the drawings I have shown an electric motor 33 mounted upon the frame 30. The shaft of the motor carries a pulley 34 which is connected by a belt 35 to a pulley 36, the pulley 36 being rigidly secured to a shaft 37 rotatably journaled in the frame 30. Also secured to the shaft 37 is a pinion 39 which meshes with a gear 40 carried by a shaft 41 (Fig. 4). Constrained to rotate with the gear 40 and mounted upon the shaft 41 is a pinion 42 which meshes with a gear 44 secured to a shaft 45. Disposed parallel to the shaft 45 is a shaft 46. Mounted upon the shafts 45 and 46 are members 47 and 48, respectively, which constitute Geneva mechanism whereby the shaft 45 may rotate the shaft 46 intermittently. Secured to the shaft 46 is a gear 50 meshing with a gear 51 fixed upon a shaft 52. Obviously, the intermittent motion of the shaft 46 will be imparted to the shaft 52. The arrangement is such that the shaft 52 will be driven in a counter-clockwise direction (Fig. 10).

Figures 1, 25:
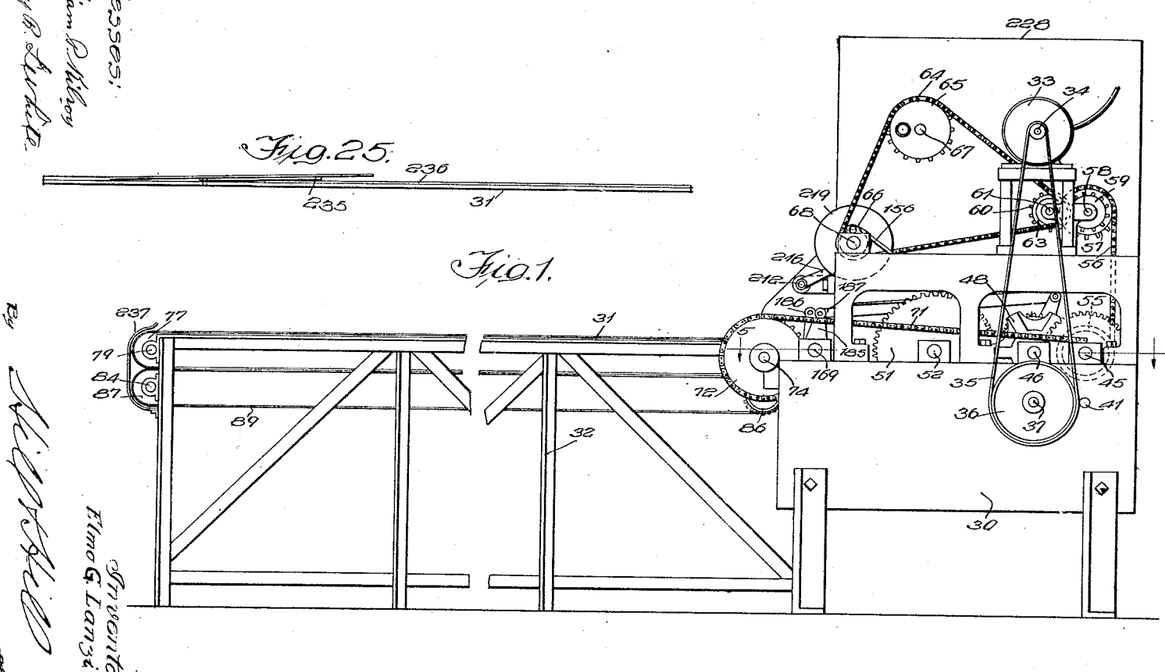
Fig. 1 is a side view of apparatus embodying the invention.
Fig. 25 is a fragmentary side elevation of a conveyor belt forming part of my improved apparatus.
Figure 2:
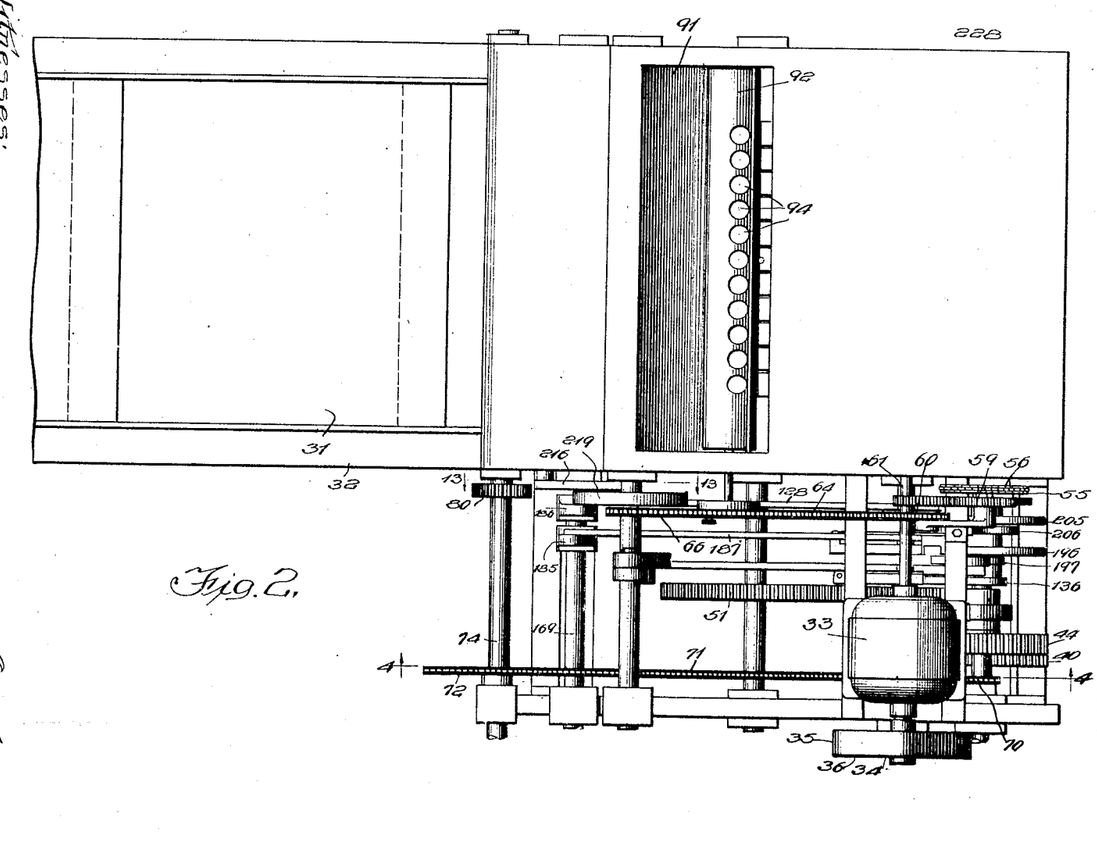
Fig. 2 is a plan view of the improved apparatus.
Figure 3:
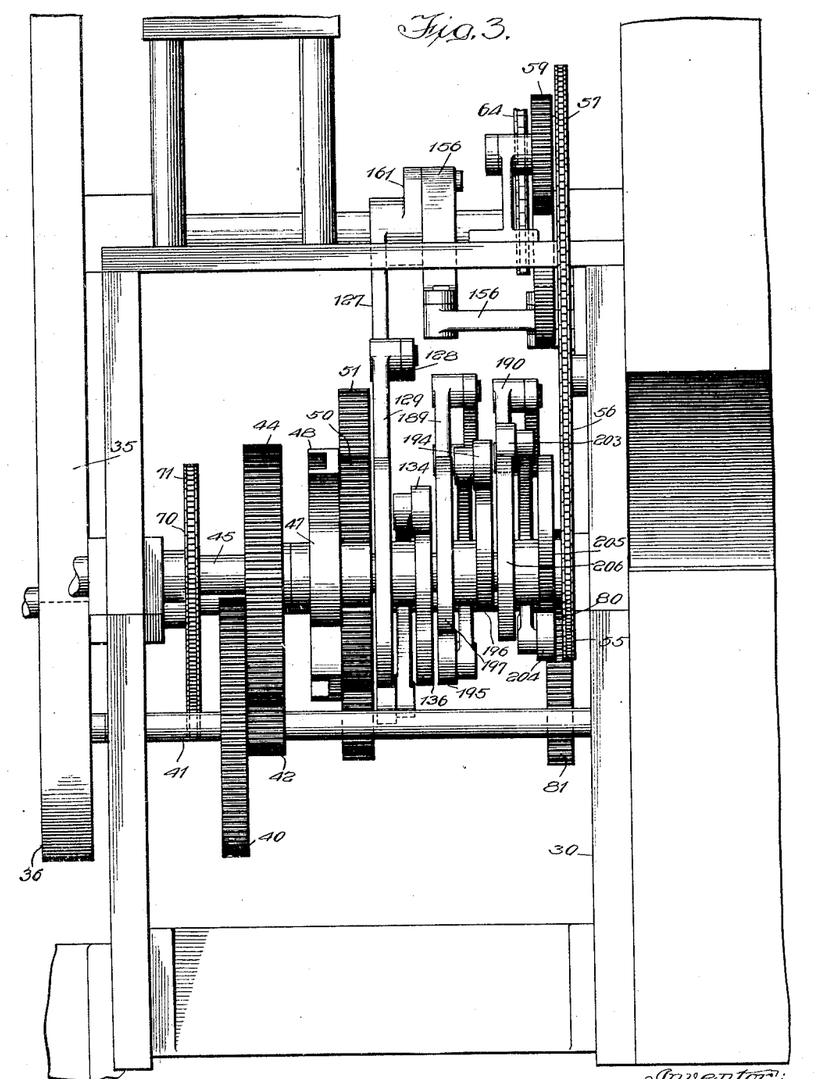
Fig. 3 is a fragmentary end elevation of the improved apparatus looking from the right of Fig. 1.
Figure 5:
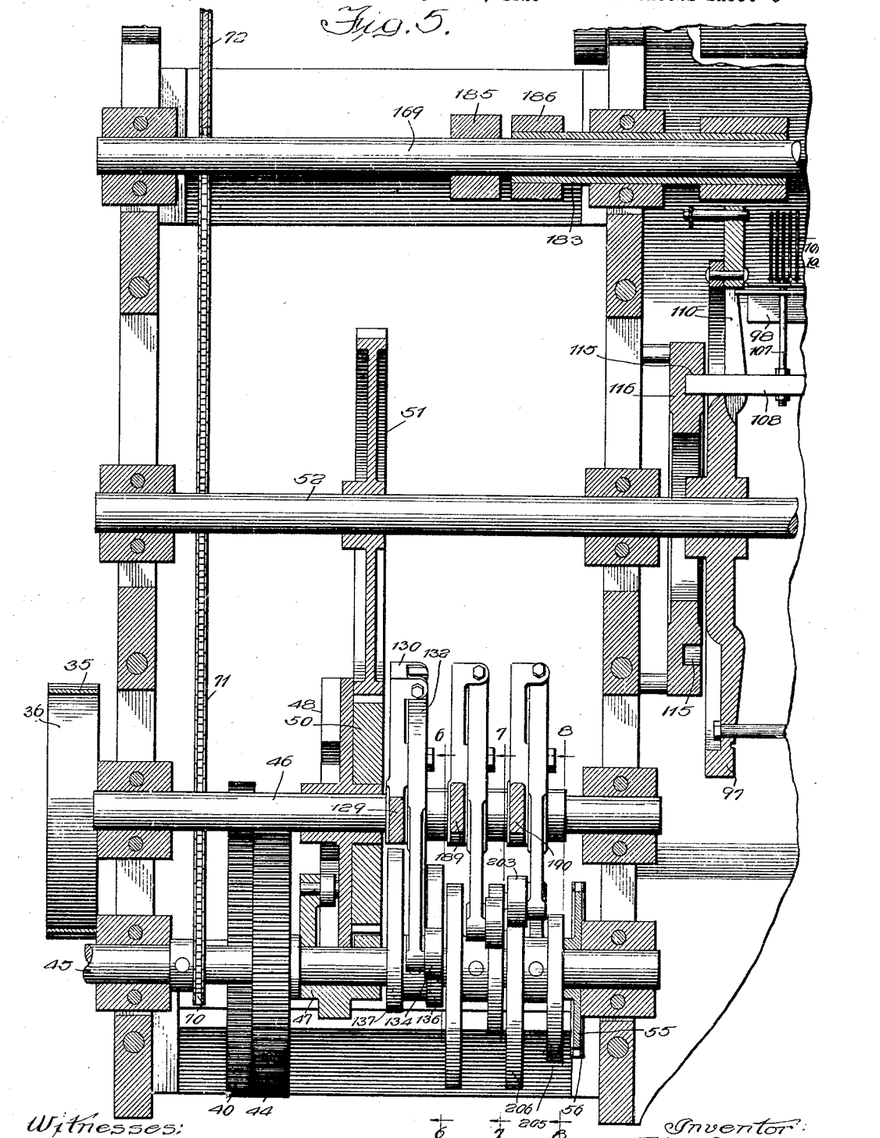
Fig. 5 is a section taken on line 5—5 of Fig. 1.

Secured to the shaft 45 is a sprocket wheel 55 which is connected by a sprocket chain 56 to a sprocket wheel 57 fixed to a shaft 58 (Figs. 1 and 5). A gear 59 secured to the shaft 58 meshes with a gear 60 secured to a shaft 61. The shaft 61 carries a sprocket wheel 63 which meshes with a sprocket chain 64, the sprocket chain 64 being trained over sprockets 65 and 66 mounted upon shafts 67 and 68, respectively. The sprocket 66 is rotatably journaled upon the shaft 68. The purpose of this construction will presently appear.

Secured to the shaft 45 is a sprocket wheel 70 which is operatively connected by a sprocket chain 71 to a sprocket wheel 72 secured upon a shaft 74 rotatably journaled in the frame 30. The shaft 74 carries a pulley 76 over which the aforementioned conveyor belt 31 is trained, the conveyor belt being also trained over a pulley 77 carried by a shaft 79 which is rotatably journaled in the auxiliary frame 32. Fixed to the shaft 74 is a gear 80 which meshes with a gear 81 secured to a shaft 82 disposed beneath the shaft 74. Disposed beneath the shaft 79 is a shaft 84 rotatably journaled in the auxiliary frame 32. The shafts 82 and 84 carry pulleys 86 and 87, respectively, over which a belt 89 is trained. The belt 89 cooperates with the belt 31 to hold sheets of oiled or waxed paper on the conveyor belt 31 for a purpose and in a manner hereinafter described.

Figure 10:
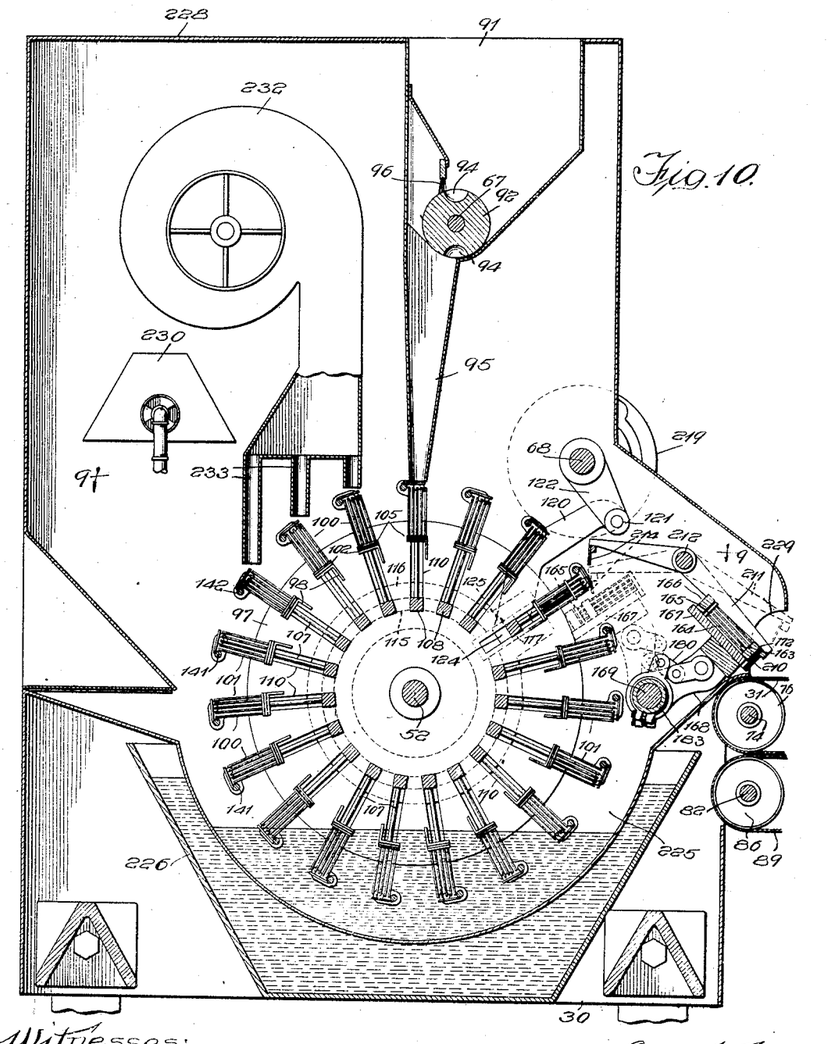
Fig. 10 is a section taken on line 10—10 of Fig. 9.

Referring now to Fig. 10, a hopper 91 is provided in the upper portion of the frame 30 for holding a supply of nuts or the like. The lower end of the hopper 91 is closed by a roll 92 fixed upon the shaft 67. A plurality of depressions 94 are formed in the roll 92 and are adapted to deliver predetermined quantities of nuts to spouts 95 depending from the hopper. A brush 96 co-acts with the roll 92 to insure that the proper quantity of nuts will be delivered by each depression 94 for each revolution of the shaft 67.

Figure 9:
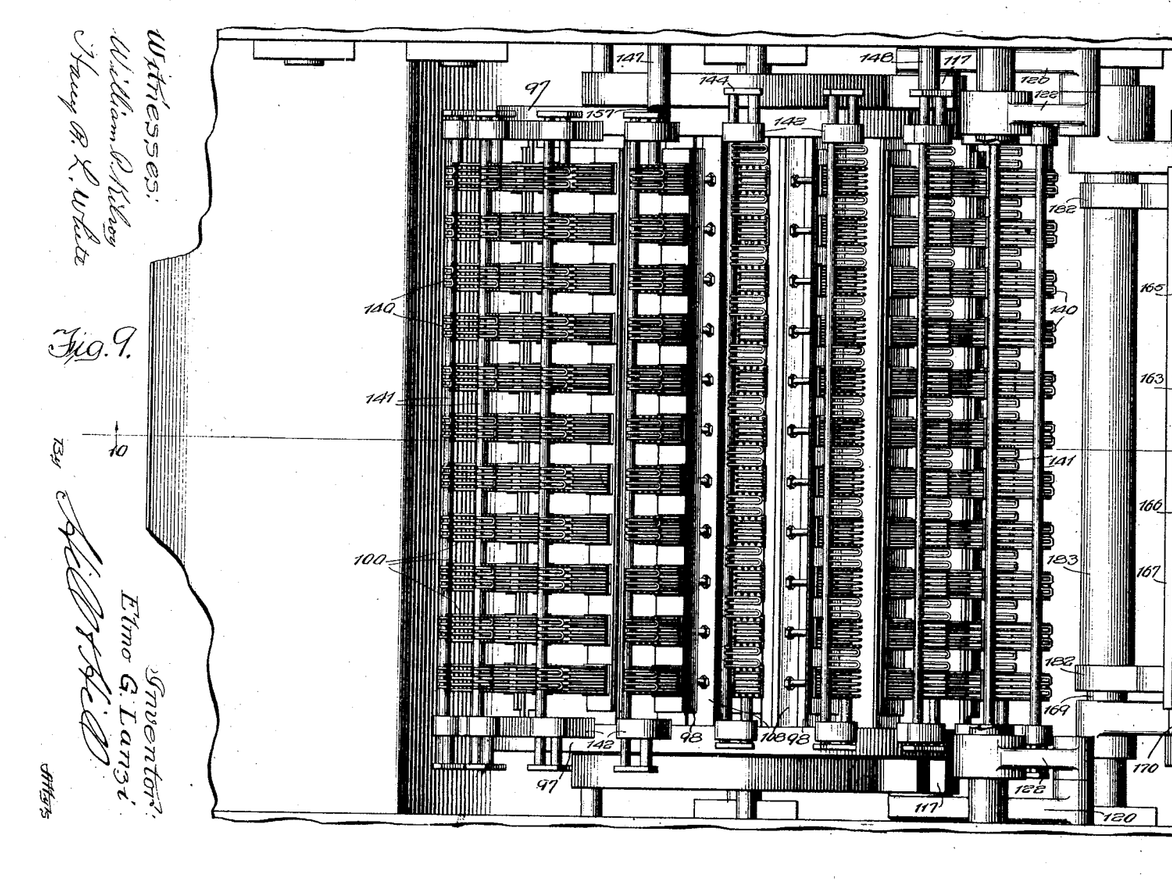
Fig. 9 is a section taken on line 9—9 of Fig. 10.
Figure 14:
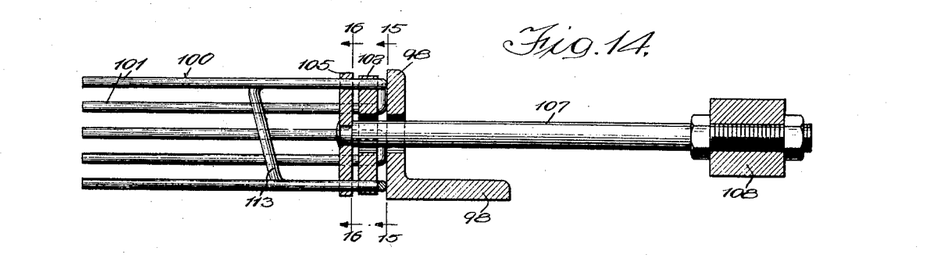
Fig. 14 is a central longitudinal section through one of a plurality of cages forming part of the improved apparatus.
Figure 15:
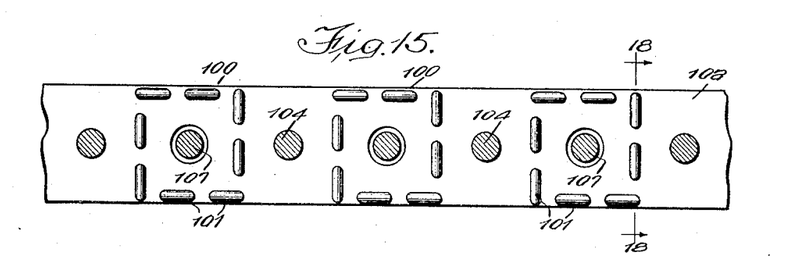
Fig. 15 is a section taken on line 15—15 of Fig. 14.
Figure 16:
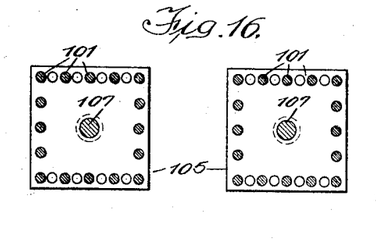
Fig. 16 is a section taken on line 16—16 of Fig. 14.
Figure 17:
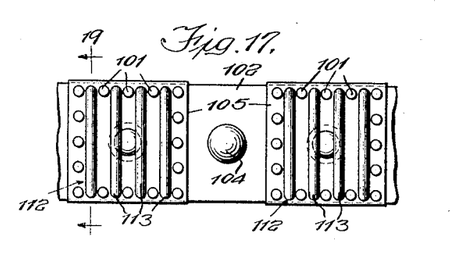
Fig. 17 is a fragmentary elevation looking at the discharge ends of a plurality of the cages.
Figure 18:
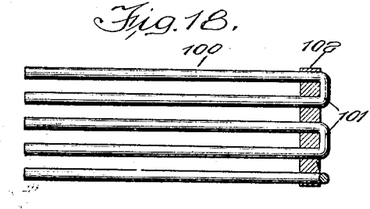
Fig. 18 is a section taken on line 18—18 of Fig. 15.
Figure 19:
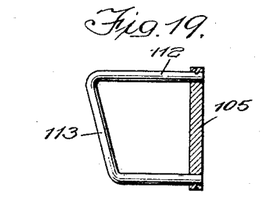
Fig. 19 is a section taken on line 19—19 of Fig. 17.
Figure 20:
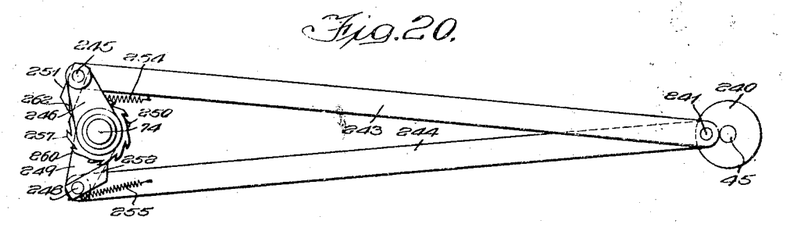
Fig. 20 is an elevation of apparatus embodying another form of the apparatus.

Rigidly secured to the aforementioned shaft 52 are discs 97 (Figs. 5, 9 and 10). Interposed between the discs 97 and secured thereto are angle irons 98. The angle irons 98 are spaced equi-distantly from each other and from the shaft 52. Mounted upon each of the angle irons 98 and radially disposed with respect to the axes of rotation of the shaft 52 are cages 100 (Fig. 14). Each of the cages 100 is preferably formed from a plurality of U-shaped rods 101 projecting through a plate 102, which is secured to the associated angle iron 98 by rivets 104. As shown in Fig. 15, the interior of the cage is substantially rectangular in cross-section. Slidably mounted upon the rods 101 of each cage 100 is a plate 105 secured to the outer end of a radially disposed rod 107, the inner end of the rod being adjustably secured to a bar 108. The ends of the bars 108 project through radially extending slots 110 formed in the discs 97. Secured to each plate 105 are bent rods 112 having inclined portions 113 extending transversely of the cage whereof they form a part.

As illustrated in Figs. 5 and 10, the ends of each bar 108 are adapted to ride in annular grooves 115 formed in plates 116, which are rigidly secured to the frame 30. The grooves 115 are so designed that during the major portion of each revolution of a bar 108 around the axis of rotation of the shaft 52, the bar will be held in a position wherein its associated plates 105 will be disposed in the inner ends of their respective cages 100. Slots 117 formed in the plates 116 communicate with the annular grooves 115 and permit the bars 108 to be radially displaced with respect to the shaft 52. When a bar 108 is moved outward in the slots 117, the associated rods 107 drive the associated plates 105 in a like direction and cause the bent rods 112 to eject the contents of the cages, the coated articles being ejected in the form of clusters in the illustrated embodiments of the invention.

The means for radially displacing the bars 108 comprises levers 120 pivotally secured by pins 121 to the free ends of levers 122, the levers 122 being secured to the shaft 68. One end of each lever 120 is provided with a rectangular lug 124 slidably journaled in one of the slots 117. Each lug 124 is provided with a groove 125 adapted to be aligned with the associated annular groove 115 so that the ends of the bars 108 may pass through it when they are rotated around the axis of rotation of the shaft 52. When the contents of the cages 100 associated with one bar 108 are to be discharged, the bar is brought into a position wherein its ends are disposed in the grooves 125. Means hereinafter described then oscillate the shaft 68 in such manner that the levers 122 cause the levers 120 to reciprocate their lugs 124 in the slots 117. As hereinbefore set forth, outward movement of a bar 108 is accompanied by a like movement of its associated plates 105 and bent rods 112 to empty the cages 100.

Figure 6:
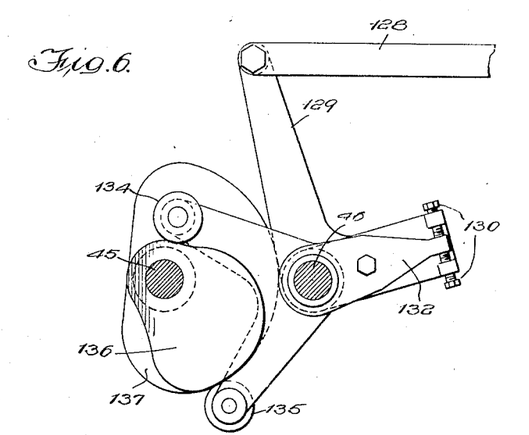
Fig. 6 is a section taken on line 6—6 of Fig. 5.

Means for oscillating the shaft 68 comprises a lever 127 secured to the shaft 68 and connected by a link 128 to one arm of a bell crank lever 129, the bell crank lever 129 being pivotally mounted upon the shaft 46 (Figs. 4 and 6). Screws or bolts 130 screw-threaded into the other arm of the bell crank lever 129 may be manipulated to adjust the bell crank lever 129 with respect to a lever 132 pivotally mounted upon the shaft 46. The lever 132 carries anti-friction rollers 134 and 135, which ride upon cams 136 and 137, respectively, the cams 136 and 137 being rigidly secured to the shaft 45. The cams 136 and 137 cooperate with the anti-friction rollers 134 and 135, respectively, to actuate the above described ejecting mechanism.

Closure members 140 comprising U-shaped rods are provided for the outer ends of the cages 100. The closure members 140 are mounted upon rods 141 slidably journaled in bracket members 142. The bracket members 142 are riveted or otherwise secured to the discs 97. Secured to each end of each rod 141 is a plate 144 carrying a relatively short rod 145 which is also slidably journaled in one of the bearing brackets 142. The rods 145 prevent angular displacement of the rods 144 around their longitudinal axes. The rods 141 may be displaced longitudinally from positions wherein the closure members 140 register with the cages 100 to positions wherein the closure members 140 are disposed between the cages 100. The means for effecting this displacement of the rods 141 comprises pins 147 and 148, which are slidably journaled in the frame 30. The pin 147 is loosely pivoted to an arm 149 of a lever 150, which also comprises arms 151 and 152. The pin 148 is loosely pivoted to the arm 151. The lever 150 is pivotally mounted by a pin 154 in a bifurcated bracket 155 mounted upon the frame 30. The pin 147 is provided with a slot 157 which may be brought into a position wherein it will engage the plates 144 disposed adjacent one of the plates 116. This position of the slot 157 is indicated in dotted lines in Fig. 12.

Figure 12:
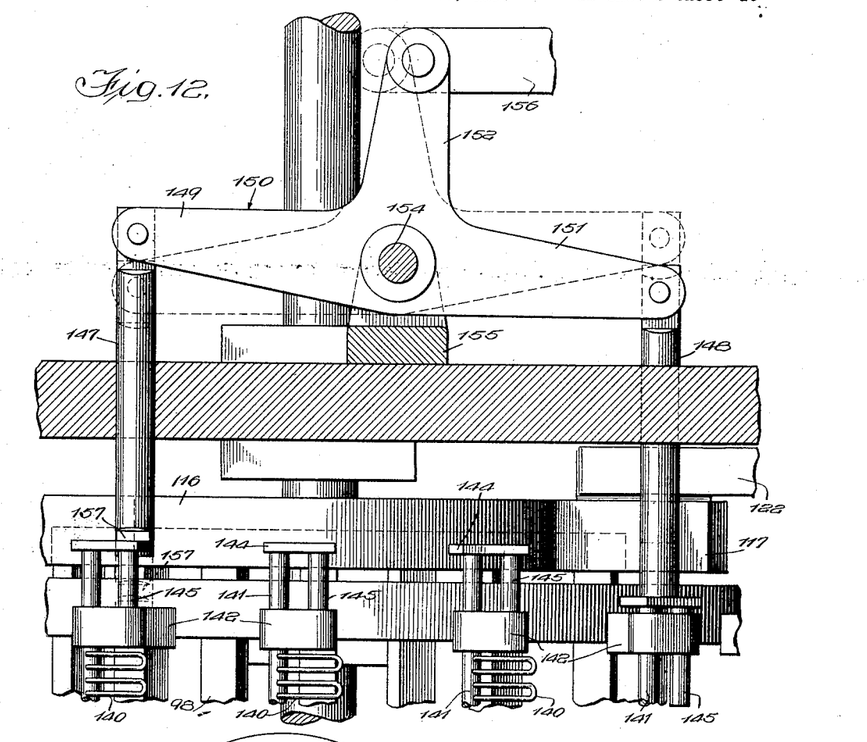
Fig. 12 is a section taken on line 12—12 of Fig. 4.

The lever 150 may be angularly displaced to bring the slot 157 into the position wherein it is shown in full lines in Fig. 12. When the pin 147 is displaced in this manner and its slot 157 has been engaged by one of the plates 144, the plate 144 together with its associated rod 141 will be brought into the position wherein the U-shaped rods 140 are disposed between the cages 100. When the lever 150 is oscillated, the pin 148 will be brought from the position wherein it is shown in full lines in the same figure so that it will displace a plate 144 to shift the associated rod 141 into the position wherein its U-shaped rods 140 close their respective cages 100.

The means for oscillating the lever 150 comprises a link 156 which is pivoted by a pin 160 to a hub 161 formed integral with the lever 127. Obviously the lever 150 will be oscillated whenever the shaft 68 is oscillated.

When the coated articles are ejected from the cages 100, they are transferred to the conveyor belt 31 by means comprising a plurality of cages or baskets 163 formed of U-shaped rods 164 secured in a plate 165 (Figs. 9 and 11). The plate 165 is rigidly secured to a block 166 which is in turn rigidly secured to a plate 167 mounted upon a U-shaped bracket 168, the bracket 168 being mounted on a shaft 169. Rigidly secured to the corners of the plate 167 are bars 170 which carry pins 171. A bar 172 slidably mounted on the pins 171 is provided with apertures 173 which accommodate the U-shaped rods 164. Secured to the ends of the bar 172 are blocks 175 to which links 176 are pivotally secured by pins 177. The links 176 connect the blocks 175 with levers 179 which are pivotally mounted intermediate their ends upon the U-shaped bracket 168. The levers 179 are connected by links 180 to collars 182 clamped upon a sleeve 183 which is rotatably journaled upon the shaft 169. As best shown in Fig. 4, levers 185 and 186 are clamped to the shaft 169 and to the sleeve 183, respectively. Links 187 and 188 connect the levers 185 and 186, respectively, to bell crank levers 189 and 190, respectively.

Figure 7:
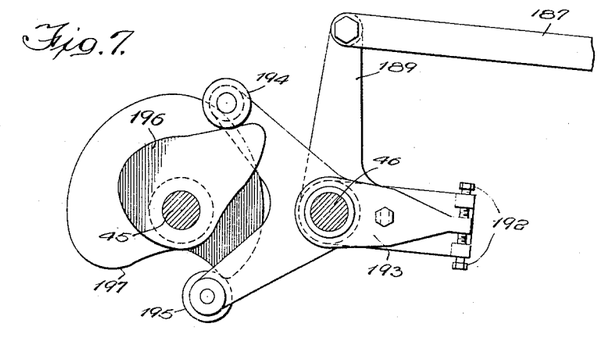
Fig. 7 is a section taken on line 7—7 of Fig. 5.
Figure 8:
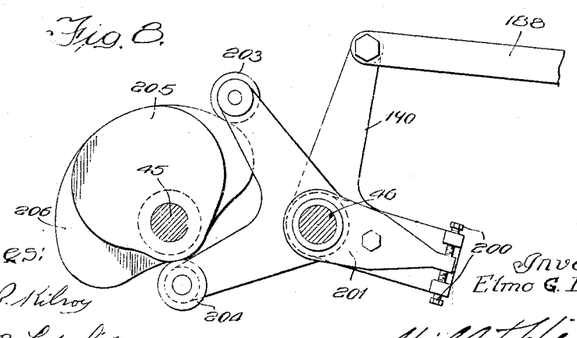
Fig. 8 is a section taken on line 8—8 of Fig. 5.

Referring now to Figs. 7 and 8, it will be noted that the bell crank levers 189 and 190 are pivoted upon the shaft 46. Screw-threaded into the bell crank lever 189 are screws or bolts 192 which may be manipulated to secure the bell crank lever in a plurality of positions with respect to a lever 193 also pivoted upon the shaft 46. The lever 193 carries anti-friction rollers 194 and 195 which cooperate with cams 196 and 197, respectively, secured to the shaft 45. Screw-threaded into the bell crank lever 190 are screws or bolts 200 which may be manipulated to hold the bell crank lever in a plurality of adjusted positions with respect to a lever 201 pivoted upon the shaft 46. Anti-friction rollers 203 and 204 carried by the lever 201 cooperate with cams 205 and 206, respectively.

The cams 196 and 197 are designed so that they will bring the cages or baskets 163 from the position wherein they are shown in full lines in Fig. 11 to the position wherein they are shown in dotted lines in the same figure, and afterwards return them to the first-mentioned position. Thus, each time clusters are ejected from a row of the cages 100, the cages or baskets 163 will be brought into the positions wherein they are shown in dotted lines in Fig. 11 to receive the ejected clusters.

The cams 205 and 206 cooperate with the anti-friction rollers 203 and 204, respectively, to bring the bar 172 from the position wherein it is shown in full lines in Fig. 11 to the position wherein it is shown in dotted lines in the same figure, and afterwards returns the bar to the first-mentioned position. Thus, each time the cages or baskets 163 are brought into the positions wherein they are shown in dotted lines on Fig. 11, the bar 172 will be brought into a position wherein it lies in relatively close proximity to the plate 165. The clusters will be ejected into the baskets 163 in such manner that the bar 172 will eject them from the baskets when the bar and baskets are returned to the positions wherein they are shown in full lines in Fig. 11. The clusters ejected from the baskets 163 will fall upon the conveyor belt 31.

Figure 13:
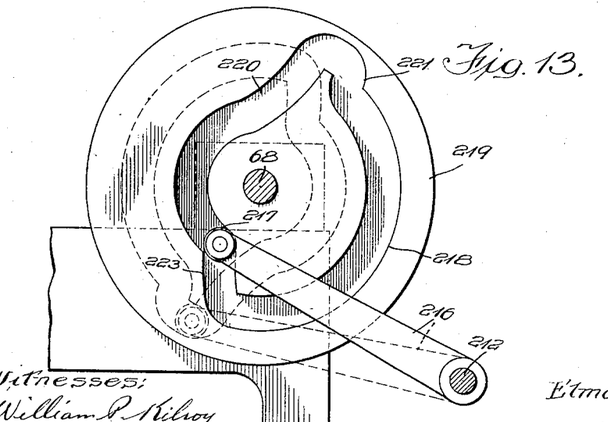
Fig. 13 is a section taken on line 13—13 of Fig. 2.

Associated with the cages or baskets 163 is a stripper plate 210 which is carried by levers 211 rigidly secured intermediate their ends to a shaft 212. The levers 211 also carry a stripper plate 214 adapted to strip coated articles from the bent rods 112 forming parts of the cages 100. The stripper plate 210 is adapted to strip the coated articles from the bar 172 when the coated articles are being ejected from the cages or baskets 163. The stripping operation is accomplished by oscillating the shaft 212 to bring the levers 211 into the extreme positions wherein they are shown in full and dotted lines in Fig. 11. The shaft 212 is oscillated by means comprising a lever 216 secured to the shaft. The lever 216 carries an anti-friction roller 217 which rides in a cam track 218 formed in a cam 219, the cam 219 being constrained to rotate with the sprocket wheel 66, which is mounted upon the shaft 68. The cam is designed to rotate in a counter-clockwise direction (Fig. 13) and the cam track 218 is provided with a portion 220 for bringing the levers 211 from the positions wherein they are shown in full lines in Fig. 11 to the positions wherein they are shown in dotted lines in the same figure. The cam track 218 is also provided with a portion 221 adapted to raise the stripper plate 214 a short distance above the position wherein it is shown in dotted lines in Fig. 11 so that the cages or baskets 163 may be retracted from the positions wherein they are shown in dotted lines in the same figure. A portion 223 of the cam track 218 causes the stripper plate 210 to strip the coated articles from the bar 172.

Mounted in the frame 30 is a vat 225 adapted to hold a supply of chocolate for coating nuts. The vat 225 preferably projects into a receptacle 226 which may hold hot water to heat the chocolate in the vat 225 to a predetermined temperature, the water in the receptacle 226 being heated by any suitable means (not shown). Formed above the vat 225 is a housing 228 which encloses the cages 100 and the baskets 163, an opening 229 being provided in the housing 228 through which the coated articles may be ejected from the baskets 163 onto the conveyor belt 31. An electric heater 230 disposed within the housing 228 provides means whereby the interior of the housing may be kept at a predetermined temperature. Also disposed within the housing 228 is a fan or blower 232 which is directly coupled to the shaft of the motor 33. The blower 232 is preferably provided with a plurality of nozzles 233 which register with some of the positions into which the cages 100 are brought when they are intermittently advanced around the axis of rotation of the shaft 52. When the blower 232 is in operation it will blow excess coating material through the nuts or other articles disposed in the cages.

In the illustrated embodiment of the invention, each row of cages 100 is presented a single time to the spouts 95 for each two revolutions of the shaft 52. Likewise, each row of cages 100 is brought to and held in the discharging position a single time for each two revolutions of the shaft 52. As shown, an odd number of rows of cages 100 are provided. The aforementioned Geneva mechanism and the gearing operatively connecting it with the shaft 52 are so designed that alternate rows of cages 100 will be presented to the spouts 95 during the intermittent rotation of the shaft 52. Obviously, alternate rows of the cages 100 will be brought to and held in the discharging position during the intermittent operation of the shaft 52. Briefly, after a row of cages have been charged with nuts and the like by the spouts 95, the charged cages will be intermittently advanced in a clockwise direction (Fig. 10) around the axis of rotation of the shaft 52 in such manner that they will pass through the chocolate disposed in the vat 225. After passing through the chocolate, the charged cages will be advanced beyond the spouts 95 to the discharging position where the aforementioned ejecting mechanism will operate to discharge the coated articles of the cages into the baskets 163.

The operation of the improved coating apparatus is substantially as follows: A supply of nuts or other articles to be coated is placed in the hopper 91 and a supply of chocolate or other coating material is placed in the vat 225. The water in the receptacle 226 is heated to bring the chocolate to a predetermined temperature, the temperature in the housing 228 being regulated by the electric heater 230. The mechanism is then set in operation. The roll 92 is rotated in synchronism with the remainder of the mechanism and delivers predetermined quantities of articles, which are to be coated, to the spouts 95 in such manner that the articles fall into a row of cages 100 positioned beneath the spouts 95, the closure members 140 being shifted into positions wherein they lie between the cages. The Geneva mechanism is designed to hold the row of cages stationary during the filling operation. After the cages have been charged with the articles to be coated, they are continuously advanced until the second following row of cages is disposed beneath the spouts 95, whereupon the cages 100 all come to a full stop. The pin 148 is then moved into the position wherein it is shown in full lines in Fig. 12 to close the recently charged cages 100 in the manner above described. Simultaneously, with this movement of the pin 148, the pin 147 is moved into the position wherein it is shown in full lines in Fig. 12 to open that row of cages 100 disposed immediately behind the cages which are then registering with the spouts 95. This sequence of operations is continued until the charged cages have been advanced through the coating material in the vat 225 and into the position directly behind the spouts 95 and are opened by the pin 147 in the manner above described. The charged cages then continue to advance until they reach the discharging position where the levers 120 are actuated to radially displace the associated bar 108 with respect to the shaft 52, which displacement causes the contents of the cages to be discharged as clusters into the baskets 163 which have been brought into the position wherein they are shown in dotted lines in Fig. 10. The clusters are stripped from the bent rods 112 by the stripper plate 214 and are then carried by the baskets 163 to positions wherein the baskets 163 are illustrated in full lines in Fig. 10. The bar 172 is simultaneously actuated to eject the clusters onto the belt 31, the clusters being stripped from the bar by the stripper plate 210. In the above described embodiment of the invention, the belt 31 is continuously driven and the clusters are distributed upon it in such a manner that they may be readily removed therefrom by an attendant.

It will be readily understood that the sprocket wheels 70 and 72 may be proportioned to drive the conveyor belt 31 at any desired speed. Obviously, the coated articles or clusters will be distributed upon the conveyor belt 31 in rows extending longitudinally thereof. The belt may be driven at a speed which will insure that the clusters in each row will be spaced from each other, or the belt may be driven at a speed which will cause the clusters to be disposed on the belt in contact with each other to form bars. In practice, the clusters are preferably dropped upon sheets of oiled or waxed paper which have been placed upon the belt 31. This permits a relatively large number of clusters to be removed from the belt at any one time. The sheets of oiled or wax paper may be placed upon the conveyor belt 31 in any desired manner, but in the preferred form of the invention, the belt 31 is provided with a plurality of flaps 235 which are secured to the belt in the manner illustrated in Fig. 25. As the belt 31 with its flaps 235 advances in a counter-clockwise direction (Fig. 25) around the pulley 77, the attendant may insert an edge of a sheet of waxed or oiled paper under each one of the flaps 235. A guard 237 carried by the auxiliary frame 32 guides the paper around the pulley 77 in such manner that the paper passes between the belt 31 and the belt 89, the belt 89 being adapted to hold the paper in place upon the conveyor belt 31. After coated articles have been discharged upon the sheet of paper, the paper and the coated articles may be removed as a unit from the conveyor belt. In Fig. 25 I have indicated a sheet of oiled or waxed paper at 236.

In Figs. 20 to 24, inclusive, I have illustrated mechanism which may be used in place of the sprocket wheels 70 and 72 and the sprocket chain 71 to drive the conveyor belt 31. This mechanism preferably comprises a disc 240 adapted to be rigidly secured to the shaft 45. A crank pin 241 projecting from the disc 240 rotatably journals one end of a link member 243 and one end of a link member 244. The other end of the link member 243 is pivotally secured by a pin 245 to a lever 246 adapted to be pivotally mounted upon the shaft 74. The other end of the link member 244 is pivoted by a pin 248 to a lever 249 also adapted to be pivotally mounted upon the shaft 74. Adapted to be rigidly secured to the shaft 74 is a ratchet 250 engageable by pawls 251 and 252, the pawls 251 and 252 being carried by the pins 245 and 248, respectively. The pawls 251 and 252 are yieldingly urged into engagement with the ratchet 250 by springs 254 and 255, respectively. Carried by the ratchet 250 is a mutilated ratchet 257. The mutilated ratchet 257 is provided with diametrically disposed arcuate slots 258 through which bolts 259 pass for securing the ratchet 257 in a plurality of adjusted positions with respect to the ratchet 250. It will be noted that the ratchet 250 is provided with a plurality of teeth equi-distantly spaced from each other. The ratchet 257 is provided with three sets of teeth 260. The teeth 260 of each set are equidistantly spaced from each other, the several sets of teeth being spaced from each other at greater angular distances.

Figures 21, 22, 23, 24:
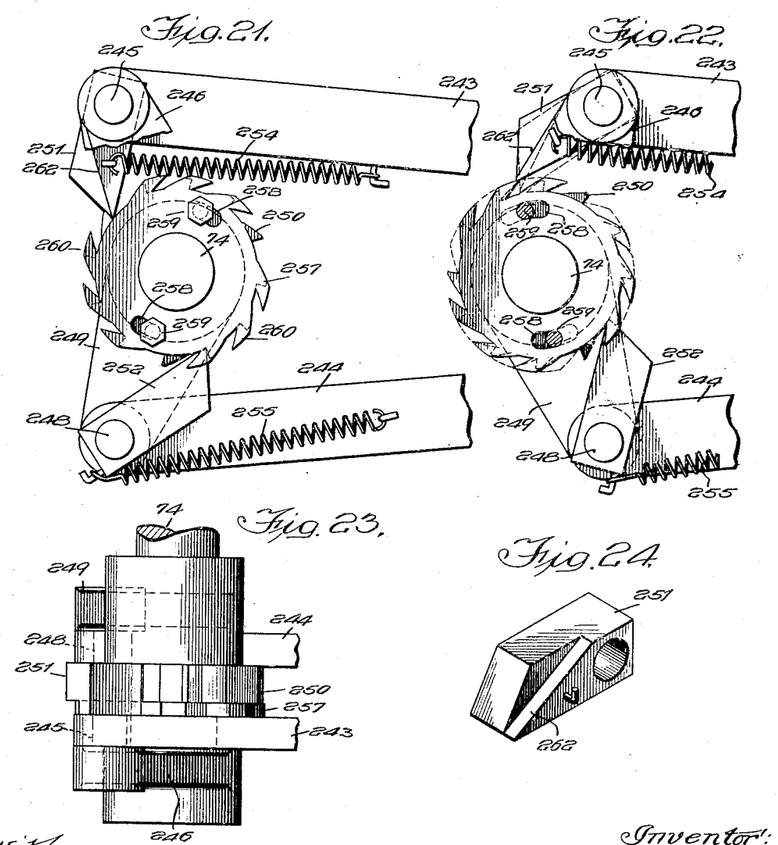
Fig. 21 is an enlarged fragmentary elevation of the apparatus shown in Fig. 20, parts of the apparatus being broken away to illustrate certain details of construction.
Fig. 22 is an elevation of the apparatus shown in Fig. 21, the apparatus being shown in a changed position.
Fig. 23 is a plan view of the apparatus shown in Fig. 21.
Fig. 24 is a perspective view of a pawl forming part of the apparatus shown in Figs. 20 to 23, inclusive.

As illustrated in Fig. 24, the pawl 251 is provided with an extension 262 engageable with the teeth 260. When the ratchets 250 and 257 are secured to each other in the manner illustrated in Fig. 21, the conveyor belt 31 is driven substantially as follows: Assuming that the pawls 251 and 252 occupy the positions wherein they are shown in Fig. 21 with respect to the ratchet wheels 250 and 257, the link members 243 and 244 will be moved to the right (Fig. 21) as the shaft 45 continues to revolve. The pawl 252 will advance the ratchet 250 through an angle substantially equal to the angular distance between any two teeth of the ratchet. The extension 262 will ride up upon one of the teeth 260. This is illustrated in full lines in Fig. 22. Then, as the links 243 and 244 return to the positions wherein they are shown in Fig. 21, the ratchet 250 will remain stationary and the pawl 252 will be brought into operative engagement with the next following tooth of the ratchet 250. This sequence of operations is continued for three revolutions of the shaft 45. During the next following revolution of the shaft 45 the relatively long distance between any two adjacent sets of teeth 260 will permit the pawl 257 to engage the tooth of the ratchet 250 during the return strokes of the links 243 and 244. Obviously the conveyor belt will be advanced a distance substantially twice the distance which it was advanced during the three preceding revolutions of the shaft 45. This arrangement of the ratchets 250 and 257 permits the coated articles to be dropped in groups of three clusters upon the conveyor belt 31 to form bars. In other words, three baskets 163 will deposit three coated clusters upon the conveyor belt in such manner that they will form a bar of the coated material. Then, as the machine continues to operate, three other baskets 163 will deposit another bar of the coated material spaced from the first bar but aligned therewith. Obviously the ratchets 250 and 257 may be designed to meet the particular needs of the manufacturer. By the above operation it will be noted that bars of coated articles will be formed due to the fact that the three coated clusters which are deposited upon the conveyor belt will be deposited in assembled overlapped relation so that the soft material of the different clusters will readily merge together, forming a complete bar.

If the mutilated ratchet 257 is angularly displaced with respect to the ratchet 250 into the position wherein it is shown in dotted lines in Fig. 22, each of the pawls 251 and 252 will advance the ratchet 250 during each revolution of the shaft 45, the motion imparted to the conveyor belt being substantially continuous. The baskets 163 will then deposit rows of spaced clusters of the coated material upon the conveyor belt 31.

The apparatus shown in Figs. 20 to 24, inclusive, constitutes an attachment which may be readily secured to ends of the shafts 45 and 74, as in the preferred form of the invention these shafts extend beyond one side of the frame 30 and enable the attendant to quickly secure the disc 240 to the shaft 45 and the ratchet 250 to the shaft 74. When the attachment is to be used, the sprocket chain 71 is removed from the sprocket wheels 70 and 72. When the attendant desires to drive the conveyor belt by means of the sprocket chain 71, the disc 240 may be left upon the shaft 45 and the ratchet 250 may be left upon the shaft 74, the means for securing the disc and the ratchets to the shafts being rendered inoperative. The apparatus shown in Figs. 20 to 24, inclusive, is in reality a part of the improved machine and constitutes together with the sprocket wheels 70 and 72, and the sprocket chain 71, adjustable means for driving the conveyor belt 31.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In apparatus of the class described, a cage, means for advancing the cage, a vat disposed in the path of the cage, a conveyor belt, means for transferring treated articles from the cage to the belt, and means for advancing the belt in a series of steps some of which are longer than the rest.

2. In apparatus of the class described, a plurality of means for carrying articles, said means being evenly spaced around an axis of rotation, means for rotating said carrying means bodily around said axis of rotation, means for filling said carrying means seriatim with articles to be coated, means for subjecting said articles to coating material, means operable simultaneously with said filling means for forcibly discharging the coated articles from the carrying means, a conveyor belt, movable basket members for transferring the coated articles direct from the carrying means to the belt, means for forcibly ejecting the articles from said basket members, and means for intermittently advancing the belt.

3. In apparatus of the class described, a plurality of means for carrying articles, said means being evenly spaced around an axis of rotation, means for rotating said carrying means bodily around said axis of rotation, means for filling said carrying means seriatim with articles to be coated, means for subjecting said articles to coating material, means operable simultaneously with said filling means for forcibly discharging the coated articles from the carrying means, a conveyor belt, movable basket members for transferring the coated articles direct from the carrying means to the belt, and adjustable means for intermittently advancing the belt.

4. In apparatus of the class described a plurality of means for carrying articles, said means being evenly spaced around an axis of rotation, means for rotating said carrying means bodily around said axis of rotation, means for filling said carrying means seriatim with articles to be coated, means for subjecting said articles to coating material, means operable simultaneously with said filling means for forcibly discharging the coated articles from the carrying means, a conveyor belt, movable basket members for transferring the coated articles direct from the carrying means to the belt and means for advancing the belt in a series of steps some of which are longer than the rest.

5. In apparatus of the class described, an odd number of rows of cages disposed around an axis of rotation, each row being disposed longitudinally of said axis of rotation, means for advancing the cages bodily around said axis of rotation, means for filling the cages with articles to be coated, a vat disposed in the path of the cages for holding a supply of coating material, means for discharging the coated articles from the cages, a conveyor belt, means for advancing the conveyor belt in a series of steps some of which are longer than the rest, movable basket members for transferring the coated articles direct from the cages to the belt, and means for forcibly ejecting the articles from said basket members.

6. In an apparatus of the class described, a plurality of cages having one of their ends closed, means for intermittently advancing the cages, means for simultaneously opening and closing the other ends of the cages at predetermined points in their movement, a vat disposed in the path of the cages, pivotally mounted means for receiving treated articles from the cages, and means for oscillating the last mentioned means.

7. In an apparatus of the class described, a cage, means for advancing the cage, a vat disposed in the path of the cage, a conveyor belt, means for transferring clusters of said treated articles from the cage to the belt, and means for advancing the belt to cause said clusters to be deposited on the belt in spaced groups, the clusters of each group being arranged in overlapping relation.

8. In an apparatus of the class described, a plurality of cages having one of their ends closed, means for intermittently advancing the cages, means for opening and closing the other ends of the cages at predetermined points in their movement, a vat disposed in the path of the cages, a conveyor belt, movable basket members for transferring treated articles from the cages to the belt, and means for stripping the treated articles from the last mentioned means.

9. In an apparatus of the character described, a cage, means for intermittently advancing the cage, a vat disposed in the path of the cage, a conveyor belt, oscillating means receiving treated articles from the cage, means for stripping the treated articles from the cage upon discharge therefrom of the articles into the receiving means, means oscillating said receiving means for depositing the treated articles upon the conveyor, and means for stripping the treated articles from the receiving means.

10. In an apparatus of the class described, a plurality of cages having one end closed, means for advancing the cages, means for opening and closing the other end of the cages at predetermined points in its movement, a vat disposed in the path of the cage, a conveyor belt, means for transferring treated articles in the clusters from the cage to the belt, and means for advancing the belt to cause said clusters to be deposited on the belt in spaced groups, the clusters of each group being arranged in overlapping relation.

11. In an apparatus of the class described, a plurality of cages, means for advancing the cages around an axis of rotation, a vat disposed in the path of the cages, a conveyor belt, means for transferring treated articles from the cages to the belt, and adjustable means for driving the belt in a series of steps of different lengths.

12. In an apparatus of the class described, a cage, means for advancing the cage, means for treating articles deposited in the cage, means forcibly ejecting the articles from the cage after treatment at a predetermined point in its movement, a conveyor belt, means for transferring the ejected articles from the cage to the conveyor belt, and means for stripping the treated articles from the last means.

13. An apparatus of the character described including a series of cages longitudinally arranged in spaced rows and having one of their ends closed, a rod paralleling each row of cages with its ends projecting beyond the ends of each row, cover members carried by the rods for normally closing the open end of the cages, plates attached to one end of each rod, a rocker arm, pins pivoted to said rocker arm, one of said pins having a slot for engagement with any one of said plates, and means for imparting movement to said rocker arm whereby to open one row of cages after engagement of one of the plates with the slot and simultaneously close another row of cages by the engagement of the other pin with the outer face of one of said plates.

14. In apparatus of the class described, means for forming coated clusters, each cluster comprising a plurality of similar articles, a conveyor, means for advancing the conveyor, means for depositing said clusters upon the conveyor, and means for adjusting said advancing means so that said clusters will be deposited on said belt in spaced groups, the clusters of each group being arranged in overlapping relation.

15. In apparatus of the kind described, the combination of means for forming coated clusters, a conveyor for receiving said clusters, means for conveying said clusters from said first mentioned means to the conveyor, and separate means for stripping the clusters from said first mentioned means and said second mentioned conveyor.

16. In apparatus of the kind described, the combination of means for forming coated clusters, means for ejecting said clusters from said forming means, means for stripping said clusters from said ejecting means, and receiving means for receiving said clusters from said means.

17. In apparatus of the class described, means for forming coated clusters, means for receiving said independent coated clusters from said first mentioned means and arranging one cluster in contacting relation to a preceding cluster to produce a bar comprised of a plurality of connected clusters.

18. In apparatus of the class described, rotatable means for forming independent coated clusters, means including longitudinally movable means for receiving said clusters, reciprocable means for transferring a cluster from said rotatable means to said longitudinally movable means, said reciprocable means and longitudinally movable means providing means for arranging one cluster in contacting relation to a preceding cluster to thereby produce a bar comprised of a plurality of connected clusters.

19. In apparatus of the class described, rotatable means having means for forming individual coated clusters, means including longitudinally movable means for receiving said clusters from said rotatable means, said longitudinally movable means being movable relatively to the rotatable means and providing an element of means for successively presenting clusters in contacting relation to each other to provide a bar comprised of a plurality of connected clusters.

20. In apparatus of the class described, means for forming coated clusters, means for receiving said clusters from the first mentioned means, and means to which said clusters are introduced by said receiving means, said receiving means and said means to which said clusters are introduced providing means for successively presenting said clusters in overlapping relation to thereby produce a bar consisting of a plurality of connected clusters.

21. In apparatus of the class described, means for forming coated clusters, means for ejecting said clusters from the forming means, means for receiving said clusters ejected from the first mentioned means, said means for receiving said clusters being movable relatively to the first mentioned means and providing an element of means for arranging said clusters in contacting relation.

22. In apparatus of the class described, rotatable means for forming coated clusters, means for receiving individual coated clusters from said first mentioned means, said last mentioned means being movable relatively to the first mentioned means and providing an element of means for arranging the individual clusters in contacting relation to provide a continuous bar comprised of a plurality of connected clusters.

23. In apparatus of the class described, the combination of means for forming coated clusters, means for ejecting said clusters from said means, a stripper for stripping said clusters from said ejecting means, a conveyor, means for conveying said clusters from said forming means to the first mentioned conveyor, and means for stripping a cluster from said last mentioned conveyor.

In testimony whereof, I have hereunto signed my name.

ELMO G. LANZI.